Oct. 11, 1960     O. C. HOLDERER     2,955,462
ROLL-MEASURING DEVICE FOR MISSILE MODELS
Filed March 31, 1959     3 Sheets-Sheet 3

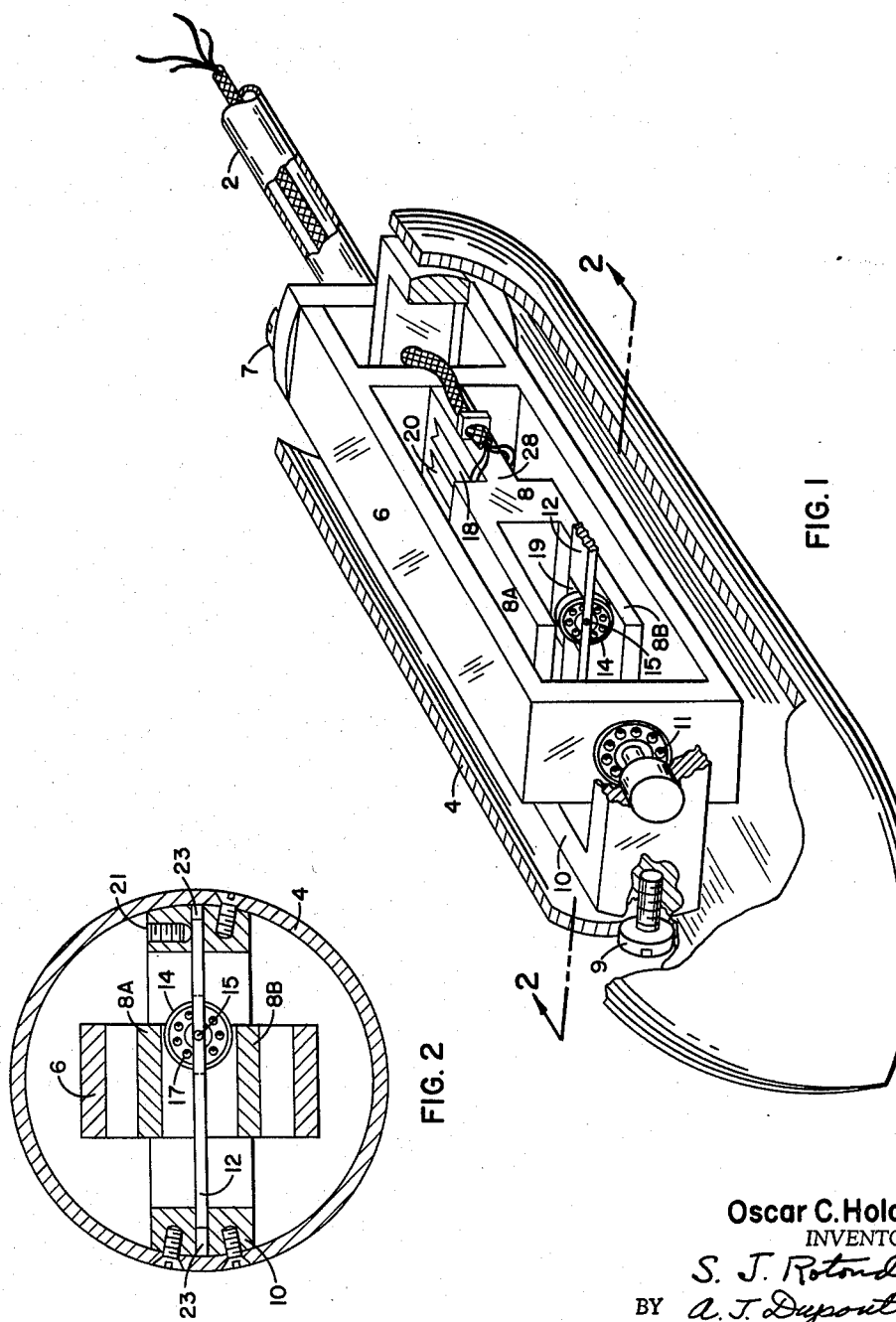

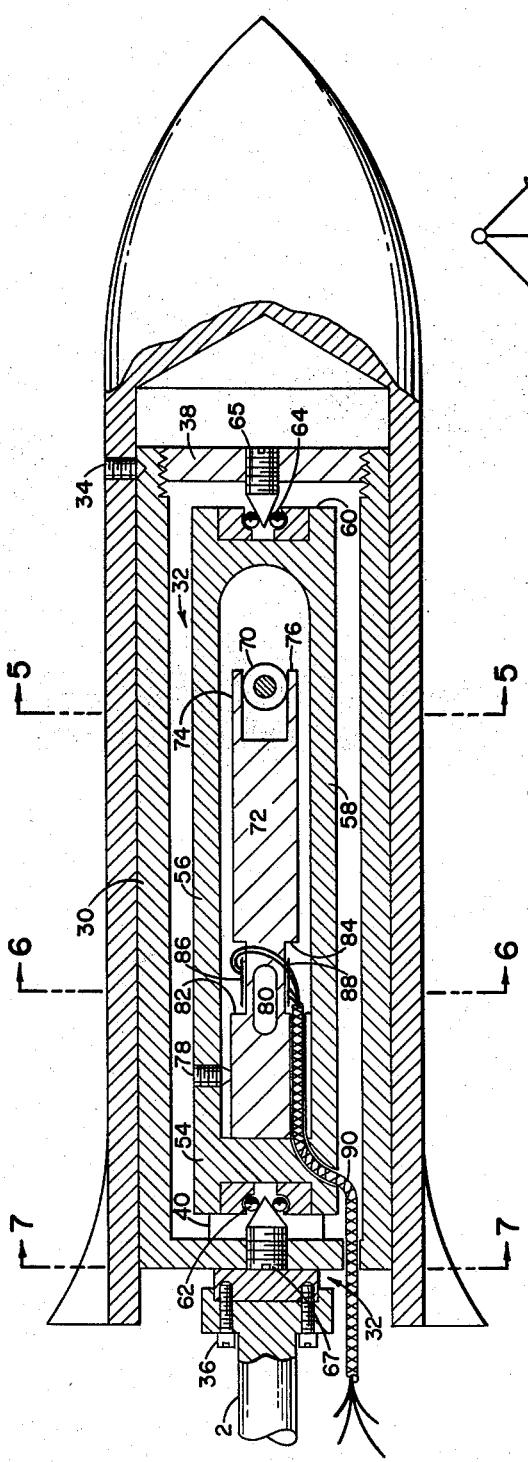

Oscar C. Holderer,
INVENTOR.

BY S. J. Rotondi,
A. P. Dupont, and
Alvin E. Moore,
ATTORNEYS.

United States Patent Office 2,955,462
Patented Oct. 11, 1960

2,955,462
ROLL-MEASURING DEVICE FOR MISSILE MODELS

Oscar C. Holderer, Huntsville, Ala., assignor to the United States of America as represented by the Secretary of the Army Filed Mar. 31, 1959, Ser. No. 803,335

8 Claims. (Cl. 73—147)

(Granted under Title 35, U.S. Code (1952), sec. 266)

The invention described herein may be manufactured and used by or for the Government for governmental purposes without the payment of any royalty thereon.

This invention relates to a roll-measuring device for missile models. It comprises a highly sensitive torque-measuring device that is capable of being easily inserted within the hollow space of a slender missile model in a wind tunnel, with part of the device fixed to the model and another part fixed to the model support.

The advent of missile configurations without wings or aerodynamic control elements, or with very short wings or control surfaces, has presented new requirements in the measurement of forces in wind tunnel tests. Rolling moments especially are of unprecedentedly small magnitude in relation to other force components. Nevertheless, the need for accurate measurements of these small roll moments exists. For example, measurement in a wind tunnel of small rolling movements induced by longitudinal cable ducts on a missile's exterior of generally cylindrical shape is desirable.

In view of these facts, it is an object of this invention to provide a roll measuring device that is capable of easy and efficient use in the wind-tunnel measurement of small rolling moments on slender missile models.

Another object of the invention is to provide a simple torque-measuring device that is highly sensitive to small torsional forces.

The foregoing and other objects of the invention will become more fully apparent from the following detailed description of exemplary structure embodying the invention and from the accompanying drawings, in which:

Figure 1 is a semi-schematic, perspective view of the roll-measuring device in assembled relation with a missile model and its support in a wind tunnel, with part of the model shown as broken away.

Figure 2 is a sectional view taken from the plane of line 2—2 of Figure 1.

Figure 3 is a diagram of the wiring of the assembled strain gauge and indicator used in the invention.

Figure 4 is an elevational view, in section along the plane 4—4 of Figure 6, of another form of the invention.

Figure 7:
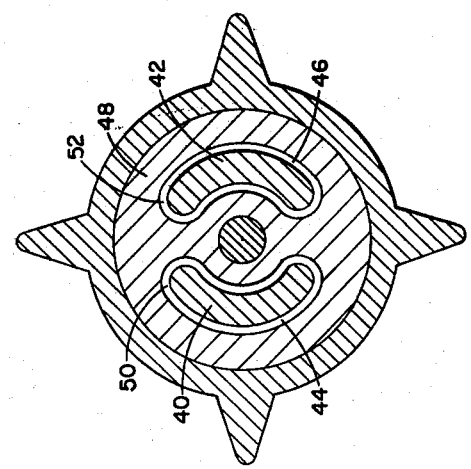

Figures 5, 6 and 7 are views in section, respectively taken from the planes 5—5, 6—6, and 7—7 of Figure 4.

Figure 8:
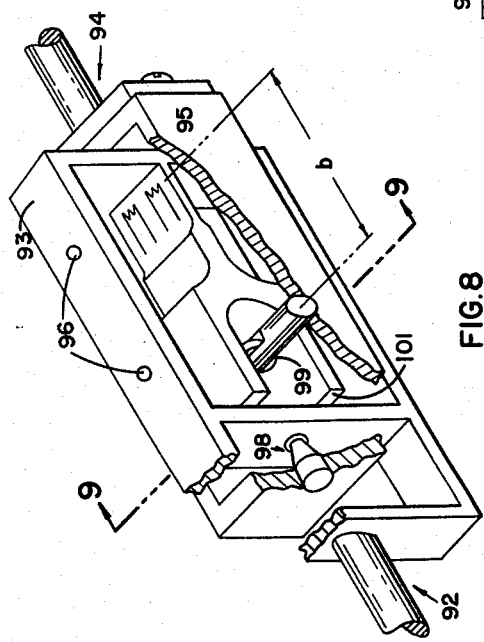

Figure 8 is a semi-schematic perspective view of another form of the invention.

Figure 9:
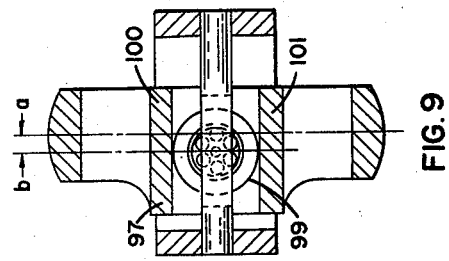

Figure 9 is a view in section taken from the plane 9—9 of Figure 8.

As illustrated in the drawings, the invention broadly comprises: an element, 2, that is fixed relative to a wind tunnel wall (or other member; that is either stationary or subject to torsional force) a missile model 4, or other element that is subject to rotary force; a frame 6, fixed to element 2; a cantilever 8 fixed to frame 6; a second frame or support, 10, fixed to the model and journaled by means of bearing 11 relative to frame 6; a cross member 12, transversely fixed to support 10, comprising a roller or equivalent bearing element 14, eccentrically located relative to bearing 11, for transmitting rotary force on the model and support 10 to cantilever 8; and means 16 (Figure 3) for indicating the amount of bending movement of cantilever 8, and thus measuring and indicating the amount of said rotary force. Measuring means 16 comprises strain gauges 18, 20, 22 and 24, only two (18 and 20) being visible in Figure 1.

In the form of the invention shown in Figures 1 to 3, element 2, known as a *sting* in wind-tunnel parlance, is fixed to frame 6 by means of screws 7, and cantilever 8 is integral with frame 6. Cantilver 8 comprises tines 8A and 8B. These tines are spaced apart by a distance that is slightly greater than the diameter of roller 14, so that when the roller is transmitting force to one of the tines it is slightly out of contact with the other tine. Roller 14 may have plain bearings but, as shown, is journaled on pintle 15 by means of antifriction bearings 17, said pintle spanning a recess 19 in cross member 12. Cross member 12 is fixed to support 10, and thus to model 4, by means of setscrew 21. Support 10 has recesses 23 of sufficient length to allow a shifting of cross member 12 after loosening setscrew 21. Thus, after resetting the setscrew, a different eccentricity of the axis of roller 14 relative to the axis of bearing 11 may be obtained.

*Operation of device of Figures 1 to 3*

After the missile or aeronautical model 4 is attached to the roll-measuring device and to sting 2, as indicated in Figure 1, the model is subjected to aerodynamic force in the wind tunnel. If the model then has an induced rolling moment tending to roll it about the axis of bearing 11 the roll force is transmitted thru screw (or screws) 9 to support 10, and from support 10 to its attached cross member 12, and thus to roller 14. If this roller were journaled on the axis of bearing 11 it would merely pivot with member 12 as this member turned on the axis of bearing 11. But since the axis of roller 14 is offset relative to the axis of the bearing the roller is forced against either tine 8A or tine 8B, exerting a force on the tined end of cantilever 8 that depends on the length of the moment arm or torque lever between the two axes. Since the tines are of sufficient thickness and strength to obviate their twisting, the said force on one of the tines causes a bending of cantilever 8 which is proportional to the roll force. This bending (and consequently the roll force) is measured by the strain gauges 18—24 and indicated by indicator 26. Roll indicator 26 is sensitive to voltage changes and is calibrated, as indicated in Figure 3, in inch-pounds of roll torque.

Since these strain gauges are very sensitive to bending of the metal of the cantilever, the torque arm between the axes of the two bearings 11 and 15 may be made very short, so that the bending force on 8 may be large relative to the roll force on the exterior of the model.

Thus a very small roll force may be measured, due to the multiplication in its conversion to bending force by the two systems of lever arms and forces. The first of these systems comprises the lever arm of the distance from the point of application of the roll force on the model's exterior to the axis of bearing 11, which may be designated by L. The second system comprises the lever or torque arm, T, of the distance between the axis of bearing 11 and the point of application of the resistance or bending force on the cantilever—that is, the distance between the axes of bearings 11 and 15. Designating the roll force as R and the bending force (that is measured) as B, we have the equation:

$$RL = BT$$

Therefore, the smaller that T can be practically made (without preventing bending of the cantilever) the greater is the force B that is measured for a given roll force, and the more sensitive is the roll-measuring device. Also, portion 28 of the cantilever, on which the strain gauges are mounted, should be thin enough to bend some under the smallest of the forces that are to be measured; and in some designs embodying the invention this portion 28 may be thinner than either of the tines 8A and 8B.

In the form of the invention shown in Figures 4 to 7, both the outer frame 30, which is fixed to the model by screw (or screws) 34, and the inner frame 32, which is fixed to support 2 by bolts 36, have cylindrical outer surfaces. Screw 34 preferably is slightly countersunk and putty or the like is placed over its head, so that the screw does not interrupt the smoothness of the model's exterior surface. Cylindrical frame 30 has a screw-threaded opening, into which end plate or bearing support 38 may be screwed. Thru this opening, in assembly of the instrument, inner frame 32 is inserted, and legs 40 and 42 (shown in Figure 7) of the bifurcated end of the frame are placed thru oblong openings 44 and 46 in end plate 48 of the frame. Openings 44 and 46 have clearances, 50 and 52, sufficiently large to allow the amount of rotary motion of frame 30, relative to inner frame 32, that is required to adequately measure the maximum rolling force to which the model (and frame 30) may be subjected. Legs 40 and 42 are joined by integral disk 54; this disk is also integrally joined to bifurcated portions 56 and 58 of frame 32; and said portions are further integrally joined to disk 60. Disks 54 and 60 fixedly support bearings 62 and 64, by means of which the model and outer frame 30 may turn relative to inner frame 32 and wind tunnel affixed support 2. The bearings may be adjusted, for initial fit or for wear compensation, by adjustment of one or both of the screws 65 and 67.

Cross bar or rod 66 is fixed to outer frame 30 by means of screw 68, and has thereon nodule 70, which is similar to and may be replaced by roller 14 of Figure 1. To vary the point of the offset engagement of the nodule and cantilever relative to the axis of bearing 62, element 66 may be replaced by a similar element with a nodule differently located on its rod. The rolling force on the model is transmitted and converted into bending force on cantilever 72 by means of this offset engagement of nodule 70 with one of cantilever tines 74 and 76.

Cantilever 72 is removably secured to the inner frame by setscrew 78. This form of the cantilever has a slot, 80, therein; and the cantilever is notched at 82 and 84, where the upper and lower strain gauges 86 and 88 are placed. This type of cantilever thus is made more sensitive to a small bending force on it, enabling accurate measurement of very slight induced roll forces on the model.

In lieu of the pair of strain gauges shown in each of the upper and lower notches of the cantilever, a single gauge may be utilized. In either event, the gauges are connected to an outside roll-force indicator by means of conductors 90 which extend thru an opening in disk 54.

The form of the invention shown in Figures 8 and 9, as well as the other disclosed forms, may be used to measure the torque between any two elements of machinery by fastening support 92 and its attached outer frame to one of said elements and support 94 and its attached inner frame 95 to the other element. Alternatively, frame 93 may be fixed to the interior of a wind tunnel model by screws or bolts in holes 96.

This form comprises an alternative type of cantilever, which may be utilized in any of the embodiments of the invention. As indicated in Figure 9, the cantilever is offset at 97, from the central plane $a$ which extends thru the axis of bearing 98, thus placing plane $b$ that extends thru the axis of roller 99 at the center of tines 100 and 101 of the cantilever. By this construction the slight torsional effect from the eccentric loading of the width of the cantilever is avoided, even though the cantilever be made of small thickness.

Within the scope of the subjoined claims, the invention comprehends various changes in the specific structure that is herein illustrated.

The following invention is claimed:

1. An instrument for measuring torsional forces between two objects comprising: a frame adapted to be fastened to one of said objects; a bearing supported by one end of said frame; a second frame having an end portion enclosed by said first-named frame and journaled by said bearing; a support fixed to an end portion of said second frame and adapted to be fixed to the other of said objects; a transverse element fixed to said first-named frame, extending thru said second frame, with a substantial clearance on each of two opposite sides of said element; a force-transmitting member supported by said transverse element, said member having a portion projecting from each of said sides into each of said clearances, the center of said member, between its said two portions, being offset along said transverse element from the axis of said bearing; a metal cantilever fixed at one of its ends to a part of said second frame that is substantially spaced from said member, said cantilever having a portion, adjacent said part, that is readily influenced by bending force, said cantilever further having a pair of forks that span said member; strain gages mounted on opposite sides of said cantilever portion for measurement of the deformation of the metal of said portion when said cantilever is subjected to bending force; and an indicator, connected to said gages, for indicating said measurement; the lever arm between the center of said member and said bearing axis being shorter than the lever arm between the application of torsional force, on one of said objects, and said bearing axis.

2. A device as set forth in claim 1, in which one of said frames comprises means for fastening it to a wind tunnel model, and the other of said frames comprises means for fastening it to a stationary wind tunnel element.

3. A device as set forth in claim 1, in which said first-named frame is elongated and cylindrical.

4. A device as set forth in claim 1, which further comprises a second bearing at the other end of said first-named frame said second frame having a portion journaled by said second bearing.

5. A device as set forth in claim 4, in which one of said bearings comprises an element for adjustment of the relative position of said bearings.

6. A device as set forth in claim 1, in which a middle portion of said cantilever is recessed to provide easy bending of said middle portion, and in which said strain gauges are mounted on opposite surfaces of said middle portion.

7. A device as set forth in claim 1, in which said force-transmitting member comprises an axle that is attached to said first-named frame and a roller, journaled on said axle.

8. A device for measuring roll forces on wind-tunnel models comprising: an outer frame adapted to be fastened to the interior of a hollow model; a bearing supported by the forward end of said frame; an inner frame partially enclosed within said outer frame and having a forward portion journaled in said bearing; a support fixed to the after end of said inner frame and adapted to be fixed to a wind tunnel; a transverse element fixed to said outer frame, extending thru said inner frame, with a substantial clearance on each of two opposite sides of said element; a force-transmitting roller journaled on said transverse element, said roller projecting from each of said sides into each of said clearances, along a plane thru its axis of rotation that is offset along said transverse element from the axis of said bearing; a metal cantilever fixed to a rear part of said inner frame, having a portion, adjacent said part, that is readily influenced by bending force, and having a pair of forwardly projecting forks that span said roller; strain gages mounted on opposite sides of said cantilever portion for measurement of the deformation of the metal of said portion when said cantilever is subjected to bending force; and an indicator located outside said frames for indicating said measurement; the torque arm between said offset plane and bearing axis being substantially less than the lever arm between the application of roll force on the exterior of said model and said bearing axis, whereby said roll force is applied to a relatively long lever arm and transmitted via said bearing axis and via a shorter torque arm and said roller to said cantilever, being converted into a relatively large bending force on said cantilever.

References Cited in the file of this patent

UNITED STATES PATENTS

| | | |
|---|---|---|
| 2,522,117 | Holt et al. | Sept. 12, 1950 |
| 2,782,636 | Peucker | Feb. 26, 1957 |
| 2,796,503 | Ward | June 18, 1957 |